(12) United States Patent
Besmer et al.

(10) Patent No.: US 6,904,481 B1
(45) Date of Patent: Jun. 7, 2005

(54) BUS SEQUENCE OPERATION WITH AUTOMATIC LINKING FROM CURRENT I/O INFORMATION TO SUBSEQUENT I/O INFORMATION

(75) Inventors: Brad D. Besmer, Colorado Springs, CO (US); Guy W. Kendall, Colorado Springs, CO (US); Brian A. Day, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 512 days.

(21) Appl. No.: 09/834,013

(22) Filed: Apr. 12, 2001

(51) Int. Cl.[7] .......................... G06F 13/00; G06F 13/14
(52) U.S. Cl. ..................... 710/107; 710/112; 710/240
(58) Field of Search ............................... 710/107, 112, 710/113, 240, 241, 5

(56) References Cited

U.S. PATENT DOCUMENTS

| | | | | |
|---|---|---|---|---|
| 5,313,588 A | * | 5/1994 | Nagashige et al. ............ | 710/5 |
| 5,726,985 A | * | 3/1998 | Daniel et al. ................ | 370/382 |
| 6,047,339 A | * | 4/2000 | Su et al. ....................... | 710/56 |
| 6,052,133 A | * | 4/2000 | Kang .......................... | 345/532 |
| 6,205,506 B1 | * | 3/2001 | Richardson ................. | 710/310 |
| 6,263,445 B1 | * | 7/2001 | Blumenau ................... | 713/201 |
| 6,434,650 B1 | * | 8/2002 | Morris et al. ............... | 710/110 |
| 6,738,821 B1 | * | 5/2004 | Wilson et al. .............. | 709/230 |

FOREIGN PATENT DOCUMENTS

| EP | 486230 A1 | * | 5/1992 | ............ G06F/5/06 |
|---|---|---|---|---|
| JP | 05035661 A | * | 2/1993 | ............ G06F/13/36 |
| JP | 09251352 A | * | 9/1997 | ............ G06F/3/06 |

OTHER PUBLICATIONS

"SCSI Host Bus Adapter Drivers." Sun Microsystems. 2002. <http://docsun.cites.uiuc.edu/sun_docs/C/solaris_9/SUN-Wdev/DRIVER/p64.html>.*
Bulte, Wilko. "What id SCSI?" FreeBSD. Jul. 6, 1996. <http://www.freebsd.org/doc/en_US>ISO8859-1/articles/storage-devices/scsi.html>.*
"Information technology—Small Computer System Interface—2." X3T9.2 Project 375D. Working Draft Revision 10L. Computer & Business Equipment Manufacturers Association. Sep. 7, 1993.*

* cited by examiner

Primary Examiner—Mark H. Rinehart
Assistant Examiner—Thomas J. Cleary
(74) Attorney, Agent, or Firm—Suiter West PC LLO (57) ABSTRACT

In a computer system, a bus adapter processes bus operation information structures for performing bus operations by automatically starting processing each bus operation information structure after completing processing the previous bus operation information structure. A processor forms the bus operation information structures and sets control over each bus operation information structure to a sequencer for processing. When a next bus operation information structure is ready for processing after completing processing the previous bus operation information structure, the sequencer checks whether it has control over the next bus operation information structure, and if so, begins processing the next bus operation information structure without being instructed to do so by the processor.

21 Claims, 6 Drawing Sheets

BUS SEQUENCE OPERATION WITH AUTOMATIC LINKING FROM CURRENT I/O INFORMATION TO SUBSEQUENT I/O INFORMATION

FIELD OF THE INVENTION

This invention relates to communication across computer buses in a computer system. More particularly, the present invention relates to a new and improved computer system having a bus adapter, such as a SCSI (Small Computer Systems Interface) host adapter, that passes I/O (input/output) bus operation information between components of the bus adapter.

BACKGROUND OF THE INVENTION

Figure 1:
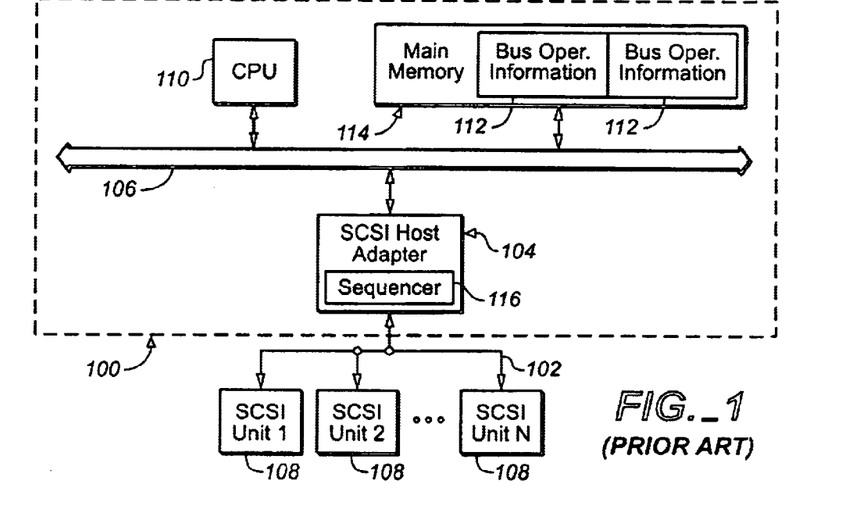
FIG. 1 is a block diagram of a prior art computer system with connected SCSI (Small Computer Systems Interface) units.

In a typical computer system 100, various types of bus systems, such as a SCSI (Small Computer Systems Interface) bus 102, are used to transfer information between components of the computer system 100, as shown in FIG. 1. A bus adapter typically transfers the information between two different bus systems within the computer system 100. A SCSI host adapter 104, for example, transfers the information between the SCSI bus 102 and a main computer bus 106, such as a PCI (Peripheral Component Interconnect) bus, an ISA (Industry Standard Architecture) bus, etc. Up to fifteen peripheral devices, or SCSI units 108, may be connected to the SCSI host adapter 104 to exchange information with the computer system 100.

When the computer system 100 sends the information to one of the SCSI units 108, a central processing unit (CPU) 110 in the computer system 100 typically forms "bus operation information structures" 112 within a main memory 114 and then instructs the SCSI host adapter 104 to process the bus operation information structures 112. The bus operation information structures 112 include instructions and data with which a sequencer 116 within the SCSI host adapter 104 performs the process (e.g. read data, write data, etc.) requested by the CPU 110. Thus, the SCSI host adapter 104 reads one of the bus operation information structures 112 from the main memory 114, performs the instructions, informs the CPU 110 that the process has been completed and then waits for the CPU 110 to inform it of the next bus operation information structure 112 to be processed.

After the CPU 110 instructs the SCSI host adapter 104 to process a first bus operation information structure 112, the CPU 110 can proceed to build a second bus operation information structure 112 in the main memory 114. However, the CPU 110 must wait for the SCSI host adapter 104 to inform it that the process indicated by the first bus operation information structure 112 has been completed before the CPU 110 can instruct the SCSI host adapter 104 to process the second bus operation information structure 112. A significant amount of time is required for the SCSI host adapter 104 to inform the CPU 110 that the first process has completed and for the CPU 110 to instruct the SCSI host adapter 104 to process the second bus operation information structure 112.

It is with respect to these and other considerations that have given rise to the present invention.

SUMMARY OF THE INVENTION

One aspect of the present invention relates to performing bus operations defined by bus operation information for a bus, such as a SCSI bus, in a computer system without requiring any significant amount of time between the completion of processing of one bus operation information and the start of processing of the next bus operation information. A processor in the computer system forms the bus operation information structures and sets control over each bus operation information structure to a sequencer. As soon as the sequencer processes a current bus operation information structure, the sequencer proceeds with processing the next bus operation information structure if the sequencer has control over the next bus operation information structure. In this manner, the speed and efficiency with which bus operations are processed is enhanced, since the sequencer does not have to wait to be instructed by the processor to process each bus operation information structure when the next bus operation information structure is already ready after processing the current bus operation information structure.

The processor is preferably included in a bus adapter, such as a SCSI host adapter, so the CPU of the computer system is not involved in the preparation of the bus operation information, except to supply a relatively high-level instruction to the processor in the host adapter to perform a requested operation on the SCSI bus. Additionally, memory blocks, or spaces, are preferably included in the bus adapter for containing the bus operation information, so the main memory of the computer system is not involved in the bus operations, except to store any data transferred to or from connected SCSI units.

A queue of pointers is preferably connected to the processor and sequencer and contains pointers that identify the bus operation information structures to be processed. Thus, after forming the bus operation information structures, the processor sends a pointer identifying the bus operation information structures to the queue, which supplies the pointers to the sequencer in the order that they were sent by the processor. "Ownership" of the bus operation information structures is thus passed from the processor to the sequencer by placing the pointers in the queue. Additionally, a "start" flag is preferably supplied from the queue to the sequencer to inform the sequencer when to read the current pointer and process the bus operation information structure. Therefore, after processing the current bus operation information structure, the sequencer immediately proceeds to process the next bus operation information structure if the start flag is set, indicating that there is already another formed bus operation information structure awaiting processing. In this manner, the sequencer processes back-to-back bus operation information structures without waiting for further instructions or commands from the processor.

Additionally, a second queue of pointers is preferably connected to the processor and sequencer and contains pointers that identify the bus operation information structures that have been processed, meaning that the memory spaces that contain the processed bus operation information structures are available for new bus operation information structures. Thus, after processing the bus operation information structures, the sequencer sends a pointer identifying the processed bus operation information structures to the second queue, which supplies the pointers to the processor in the order that they were sent by the sequencer. "Ownership" of the bus operation information structures is thus passed from the sequencer to the processor by placing the pointers in the second queue. Additionally, a "complete" flag is preferably supplied from the queue to the processor to inform the processor when to read the current pointer. Therefore, after forming the current bus operation information structure, the processor immediately proceeds to form the next bus operation information structure if there is already an available memory space or the start flag is set, indicating that there is a memory space that has become available. In this manner, the processor forms back-to-back bus operation information structures without waiting for any responses from the sequencer regarding the processing of any previous bus operation information structures.

Alternatively, each bus operation information structure preferably includes a link, e.g. in a link field, that identifies the next bus operation information structure. The link is set by the processor upon forming the bus operation information structure, and as soon as the sequencer finishes processing the bus operation information structure, it follows the link to the next bus operation information structure. Each bus operation information structure also preferably includes an owner field, which indicates whether the sequencer has control over, or "ownership" of, the bus operation information structure. Thus, when the sequencer follows the link to the next bus operation information structure, the sequencer checks the owner field to determine whether it can start to process the next bus operation information structure. If the owner field indicates that the processor has control over the next bus operation information structure, however, then the sequencer preferably waits after checking the owner field for the processor to signal it to start processing the next bus operation information structure.

A more complete appreciation of the present invention and its improvements can be obtained by reference to the accompanying drawings, which are briefly summarized below, by reference to the following detailed description of a presently preferred embodiment of the invention, and by reference to the appended claims.

DETAILED DESCRIPTION

Figure 2:
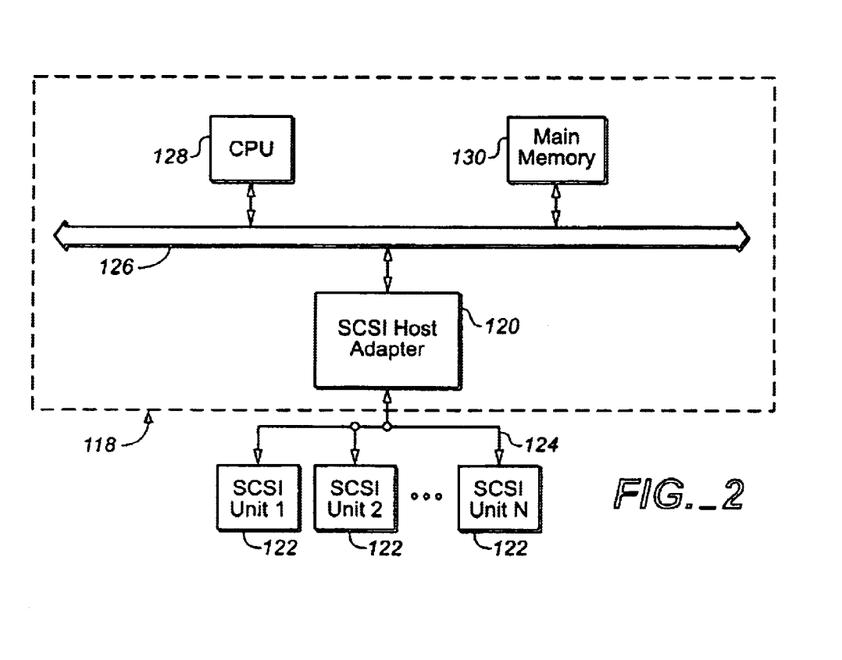
FIG. 2 is a block diagram of a computer system incorporating the present invention and connected SCSI units.

A computer system 118 (such as an 80×86-compatible personal computer), as shown in FIG. 2, includes a SCSI (Small Computer Systems Interface) host adapter 120 for connecting the computer system 118 to conventional SCSI units 122 (such as hard drives, tape drives and CD ROM drives, among others) through a conventional SCSI bus 124. The computer system 118 also includes one or more conventional computer buses 126 (such as Industry Standard Architecture "ISA," Extended ISA "EISA," Microchannel Architecture "MCA," Peripheral Component Interconnect "PCI," etc.), a conventional central processing unit (CPU) 128 (such as a Pentium-compatible microprocessor) and a conventional main memory 130 (such as dynamic random access memory "DRAM"). The SCSI host adapter 120, the CPU 128 and the main memory 130 connect directly or indirectly to the computer bus 126 to transfer information (such as data read commands, data write commands, status commands, etc.) through the computer bus 126 between the SCSI host adapter 120, the CPU 128, the main memory 130 and any other components (not shown) of the computer system 118. Thus, when the CPU 128 needs to transfer information with any of the SCSI units 122, it sends an I/O (input/output) message across the computer bus 126 to the SCSI host adapter 120. The SCSI host adapter 120 interprets the I/O message to perform SCSI bus operations to access the desired SCSI unit 122 and return any response back through the computer bus 126 to the CPU 128.

Figure 3:
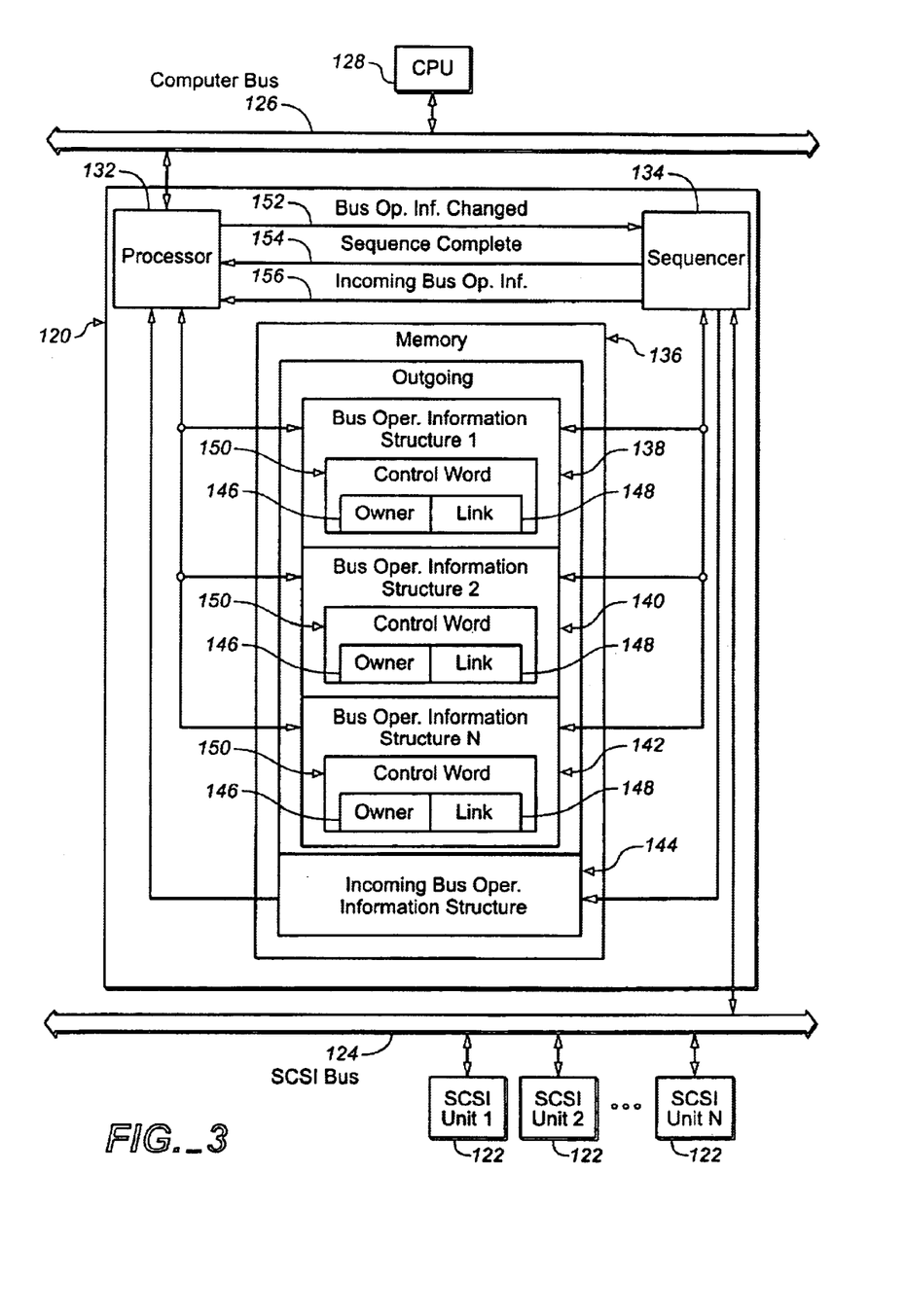
FIG. 3 is a block diagram of a SCSI host adapter incorporated in the computer system shown in FIG. 2.

The SCSI host adapter 120, as shown in FIG. 3, includes a processor 132 (such as a conventional general-purpose processor), a sequencer 134 and memory space 136 (such as a conventional DRAM or SRAM) for bus operation, or "context," information structures 138, 140, 142 and 144. The processor 132 connects the SCSI host adapter 120 to the computer bus 126 and the CPU 128 of the computer system 118 (FIG. 2). The processor 132 receives the I/O messages across the computer bus 126 from the CPU 128 and returns I/O responses back across the computer bus 126 to the CPU 128. The sequencer 134 connects the SCSI host adapter 120 to the SCSI bus 124 and the SCSI units 122. The sequencer 134 controls signals on the SCSI bus 124 to carry out conventional SCSI bus operations for accessing the SCSI units 122.

The processor 132 interprets the I/O messages received from the CPU 128 into bus operation information which the processor 132 stores in the memory space 136 for one or more of the bus operation information structures 138, 140 and 142. The sequencer 134 reads the bus operation information from the bus operation information structures 138–142 and processes the bus operation information. The bus operation information supplies data required by the sequencer 134 to perform sequences that control the bus signals that perform the SCSI bus operations for accessing the SCSI units 122 as desired by the CPU 128.

In addition to other information conventionally required for performing SCSI bus operations by the sequencer 134, the bus operation information structures 138–142 include a corresponding "owner" field 146 and a corresponding "link" field 148, typically within a "control word" 150. The owner field 146, typically a single bit supplying control information, indicates whether the processor 132 or the sequencer 134 "owns," or has control over, the corresponding bus operation information structure 138–142. The processor 132 has control over the bus operation information structure 138–142 when the processor 132 is forming the bus operation information in the bus operation information structure 138–142. The sequencer 134 has control over the bus operation information structure 138–142 when the sequencer 134 is processing the bus operation information in the bus operation information structure 138–142 to perform the SCSI bus operations. Therefore, the processor 132 sets the owner field 146 to the sequencer 134 when the processor 132 finishes forming the bus operation information in the bus operation information structure 138–142, so the sequencer 134 can process the bus operation information. Likewise, the sequencer 134 sets the owner field 146 back to the processor 132 when the sequencer 134 finishes processing the bus operation information, so the processor 132 can form another bus operation information in the bus operation information structure 138–142.

After the processor 132 has formed one of the bus operation information structures 138–142 and set the owner field 146 to the sequencer 134, to inform the sequencer 134 that it can start processing the bus operation information structure 138–142, the processor 132 sends a signal 152 to the sequencer 134 indicating that the bus operation information has changed and indicating which bus operation information structure 138–142 is to be processed. The sequencer 134 may check the owner field 146 of the bus operation information structure 138–142 to confirm that the sequencer 134 is supposed to process the bus operation information structure 138–142. After the sequencer 134 has processed the bus operation information structure 138–142 (i.e. has performed the desired sequence indicated by the bus operation information structure 138–142) and set the owner field 146 back to the processor 132, to inform the processor 132 that the bus operation information structure 138–142 has been processed, the sequencer 134 sends a signal 154 to the processor 132 indicating that the sequence has been completed. The processor 132 checks the owner field 146 of the next bus operation information structure 138–142 when it is ready to form the next bus operation information therein to determine whether the next bus operation information structure 138–142 is available. If the owner field 146 of the next bus operation information structure 138–142 is set to the sequencer 134, however, meaning that the sequencer 134 has not finished processing the next bus operation information structure 138–142, then the processor 132 waits for the sequence complete signal 154 to be asserted before forming the next bus operation information structure 138–142.

The link field 148 includes a sufficient number of bits to address each of the bus operation information structures 138–142. For three bus operation information structures 138–142, for example, only two bits are needed. The processor 132 sets the link field 148 of the bus operation information structure 138–142 it is currently forming to indicate the next bus operation information structure 138–142, which the sequencer 134 is to process after processing the current one. Typically, the bus operation information structures 138–142 are processed in a loop (e.g. 138, 140, 142, 138, 140, 142, etc.), so the value in the link field 148 does not usually have to change for each bus operation information structure 138–142.

After the sequencer 134 finishes processing the current bus operation information structure (e.g. 138), the sequencer 134 reads the link field 148 of the current bus operation information structure 138 to determine the next bus operation information structure (e.g. 140). The sequencer 134 then reads the owner field 146 of the next bus operation information structure 140 to determine whether the sequencer 134 has control over the next bus operation information structure 140, meaning that the processor 132 has finished forming the next bus operation information structure 140. If the owner field 146 indicates that the sequencer 134 has control over the next bus operation information structure 140, then the sequencer 134 immediately starts processing the next bus operation information structure 140 without waiting for the bus operation information changed signal 152 from the processor 132 for the next bus operation information structure 140. Likewise, after forming the current bus operation information structure 138, the processor 132 immediately starts forming the next bus operation information structure 140, if available, without waiting for the sequence complete signal 154 from the sequencer 134 for the current bus operation information structure 138. Thus, the owner field 146 and the link field 148 enable the processor 132 and sequencer 134 to continue operating without waiting for each other, thereby resulting in a faster processing time than possible in the prior art.

When one of the SCSI units 122 sends information to the CPU 128, the sequencer 134 detects that the SCSI unit 122 is ready to send the information and performs an information input operation. Upon performing the information input operation, the sequencer 134 preferably places information regarding the input information for use by the processor 132 for sending the input information to the CPU 128 in a separate "incoming" bus operation information structure 144. To inform the processor 132 that the incoming bus operation information structure 144 is ready for the processor 132 to send the input information to the CPU 128, the sequencer 134 sends a signal 156 to the processor 132 indicating that incoming bus operation information is available and indicating the bus operation information structure 138 or 144 that contains the changed bus operation information.

Figure 4:
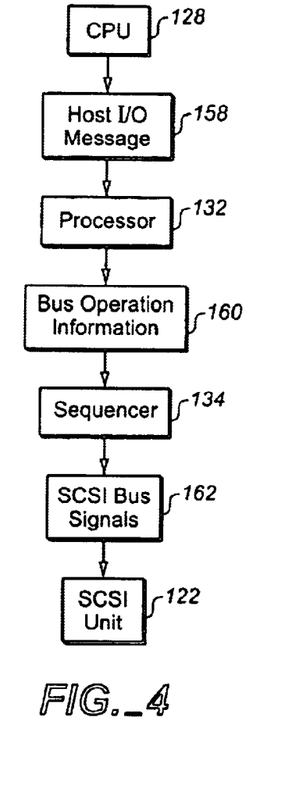
FIG. 4 is a flow chart of a flow of information between the computer system and SCSI units shown in FIG. 2 through the SCSI host adapter shown in FIG. 3.

A general procedure for sending an I/O message from the CPU 128 to one of the SCSI units 122 is illustrated by the flow of data shown in FIG. 4. The CPU 128 prepares a host I/O message 158 and sends it to the processor 132 in the SCSI host adapter 120 (FIGS. 2 and 3). The processor 132 receives the host I/O message 158 and generates bus operation information 160 from the host I/O message 158, places the bus operation information 160 into one of the bus operation information structures 138–142 (FIG. 3) and sends the bus operation information changed signal 152 (FIG. 3) to the sequencer 134. The sequencer 134 reads the bus operation information structure 138–142 and generates SCSI bus signals 162 on the SCSI bus 124 (FIGS. 2 and 3). The SCSI bus signals 162 are transmitted to the SCSI unit 122, which responds accordingly.

Figure 5:
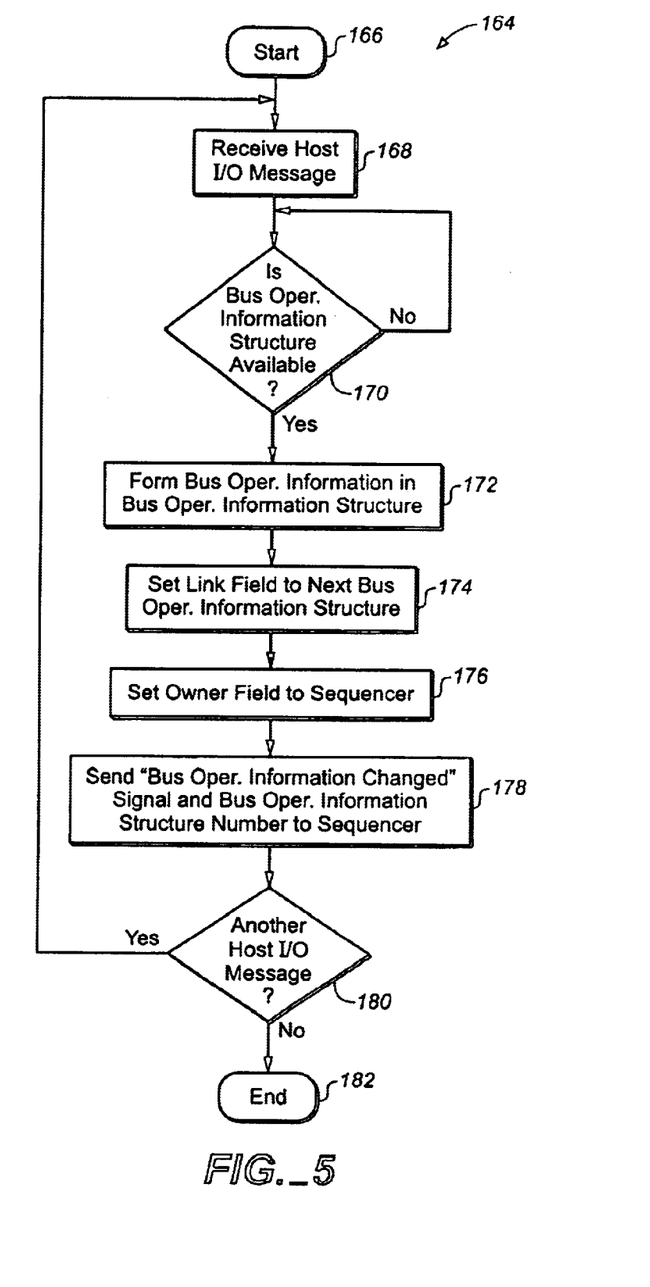
FIG. 5 is a flow chart of a procedure for performing a portion of the flow of information shown in FIG. 4 by a processor incorporated in the SCSI host adapter shown in FIG. 3.

A procedure 164 for the processor 132 (FIG. 3) to form the bus operation information 160 (FIG. 4) and to instruct the sequencer 134 (FIG. 3) to start processing the bus operation information 160 is shown in FIG. 5. The procedure 164 starts at step 166. The processor 132 receives the host I/O message 158 (FIG. 4) at step 168. Then it is determined (step 170) whether one of the bus operation information structures 138–142 (FIG. 3) is available, i.e. whether the owner field 146 (FIG. 3) of the bus operation information structure 138–142 is set to the processor 132. If not, then the procedure 164 waits until one of the bus operation information structures 138–142 becomes available. When the bus operation information structure 138–142 becomes available, the bus operation information (describing the I/O sequence for carrying out the SCSI access request contained in the host I/O message 158) is formed (step 172) in the bus operation information structure 138–142. The link field 148 (FIG. 3) is set (step 174) to the next bus operation information structure 138–142. Although, in some circumstances, the link field 148 of the bus operation information structure 138–142 may be set to the same bus operation information structure 138–142, i.e. to start a new I/O phase at the same bus operation information structure 138–142. The owner field 146 is set (step 176) to the sequencer 134. The bus operation information changed signal 152 (FIG. 3) and the number of the bus operation information structure 138–142 are sent (step 178) to the sequencer 134, so the sequencer 134 can start processing the changed bus operation information structure 138–142 if the sequencer 134 has already finished processing any previous bus operation information structure 138–142 and is waiting for the next one. If there is another host I/O message 158 to be handled (step 180.), then the procedure 164 repeats. If there is not another host I/O message 158 to be handled (step 180), then the procedure 164 ends at step 182.

Figure 6:
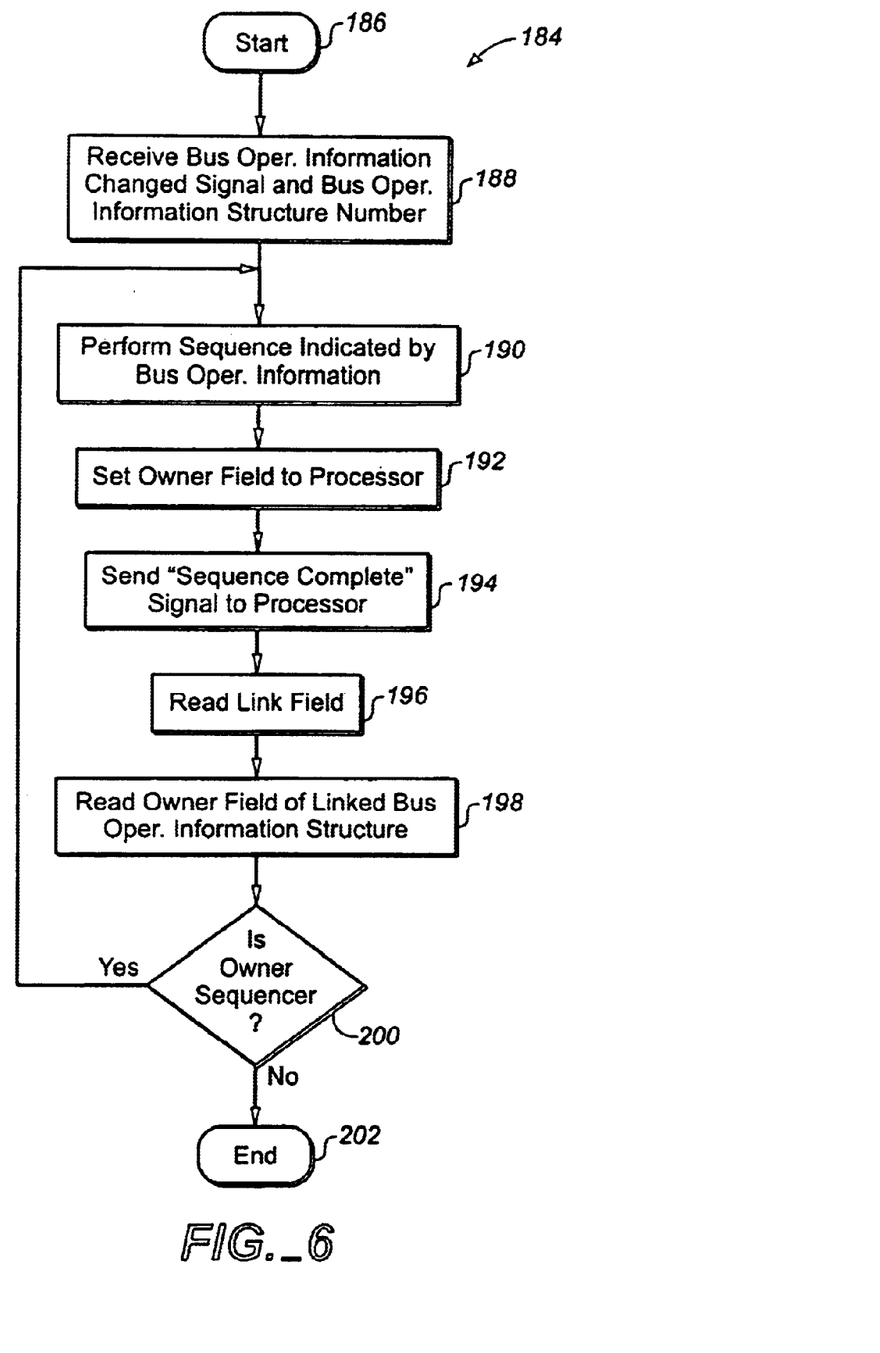
FIG. 6 is a flow chart of a procedure for performing another portion of the flow of information shown in FIG. 4 by a sequencer incorporated in the SCSI host adapter shown in FIG. 3.

A procedure 184 for the sequencer 134 (FIG. 3) to process one of the bus operation information structures 138–142 (FIG. 3) is shown in FIG. 6. The procedure 184 starts at step 186. The sequencer 134 receives (step 188) the bus operation information changed signal 152 (FIG. 3) and the number of the bus operation information structure 138–142, assuming that the sequencer 134 does not automatically start processing this bus operation information structure 138–142 after the previous bus operation information structure 138–142. The sequence, or operation, indicated by the bus operation information 160 (FIG. 4) in the bus operation information structure 138–142 is performed (step 190). The owner field 146 (FIG. 3) is set (step 192) back to the processor 132 (FIG. 3). The sequence complete signal 154 (FIG. 3) is sent (step 194) to the processor 132. The link field 148 (FIG. 3) is read (step 196) to obtain the number of the next bus operation information structure 138–142. The owner field 146 of the next bus operation information structure 138–142 is read (step 198) to determine whether the sequencer 134 can start processing the next bus operation information structure 138–142 immediately. If the owner field 146 of the next bus operation information structure 138–142 is set to the sequencer 134 (step 200), then the procedure 184 repeats starting at step 190. If the owner field 146 of the next bus operation information structure 138–142 is not set to the sequencer 134 (step 200), then the procedure 184 ends at step 202, and the sequencer 134 waits for the next bus operation information changed signal 152 before proceeding further.

Figure 7:
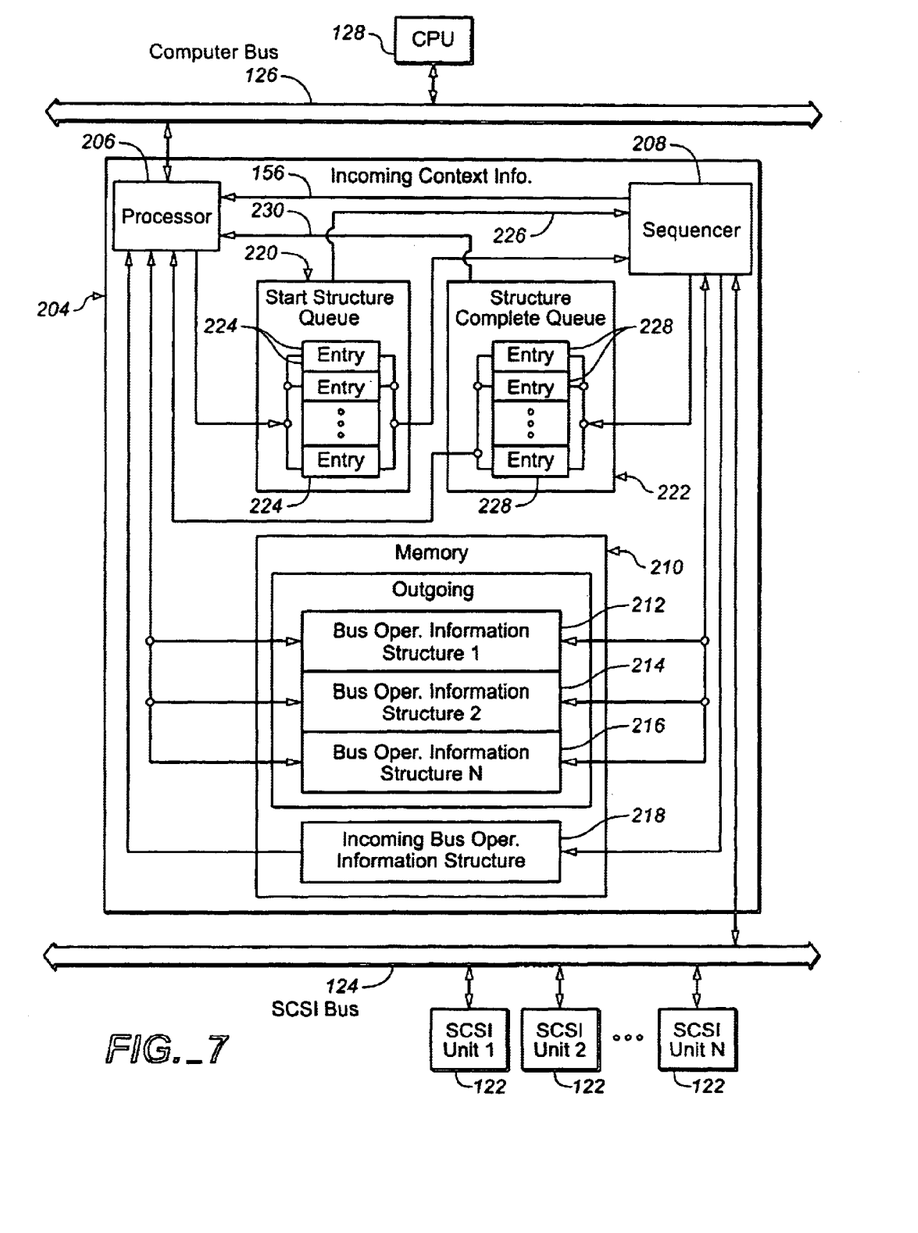
FIG. 7 is a block diagram of an alternative SCSI host adapter incorporated in the computer system shown in FIG. 2.

In an alternative preferred embodiment, a SCSI host adapter 204, as shown in FIG. 7, includes a processor 206 (such as a conventional general-purpose processor), a sequencer 208, memory space 210 (such as a conventional DRAM) for bus operation information structures 212, 214, 216 and 218, a "start structure" queue 220 and a "structure complete" queue 222. The processor 206 connects the SCSI host adapter 204 to the computer bus 126 and the CPU 128 of the computer system 118 (FIG. 2). The processor 206 receives the I/O messages across the computer bus 126 from the CPU 128 and returns I/O responses back across the computer bus 126 to the CPU 128. The sequencer 208 connects the SCSI host adapter 204 to the SCSI bus 124 and the SCSI units 122. The sequencer 208 controls signals on the SCSI bus 124 to carry out conventional SCSI bus operations for accessing the SCSI units 122.

The processor 206 interprets the I/O messages received from the CPU 128 into bus operation information which the processor 206 stores in the memory space 210 for one or more of the bus operation information structures 212, 214 and 216. The sequencer 208 reads the bus operation information from the bus operation information structures 212–216 and processes the bus operation information. The bus operation information supplies data required by the sequencer 208 to perform sequences that control the bus signals that perform the SCSI bus operations for accessing the SCSI units 122 as desired by the CPU 128.

Instead of using the owner field 146 (FIG. 3) and link field 148 (FIG. 3), the SCSI host adapter 204 uses the start structure queue 220 and the structure complete queue 222 to transfer ownership of the bus operation information structures 212–216 between the processor 206 and the sequencer 208. The queues 220 and 222 are preferably implemented in hardware, but may also be implemented in software. The start structure queue 220 is used by the processor 206 to transfer ownership of the bus operation information structures 212–216 to the sequencer 208, so the sequencer 208 can start to process the bus operation information structure 212–216 The structure complete queue 222 is used by the sequencer 208 to transfer ownership of the bus operation information structures 212–216 back to the processor 206, so the processor 206 can form the next bus operation information structure 212–216. Therefore, the processor 206 does not have to use additional time making further entries in the control words (not shown) to establish the owner of the bus operation information structures 212–216 or to set a link to the next bus operation information structure 212–216.

The start structure queue 220 includes a queue of entries 224 that contain an identifier for, or pointer to, the bus operation information structures 212–216 that are ready for processing by the sequencer 208. Thus, upon forming one of the bus operation information structures 212–216, the processor 206 sends the pointer for the formed bus operation information structure 212–216 to the start structure queue 220. The pointer is then placed in the next available entry 224. The pointer for the next bus operation information structure 212–216 to be processed is supplied as an output value from the start structure queue 220.

Whenever any of the entries 224 contains a pointer to an unprocessed bus operation information structure 212–216, the start structure queue 220 asserts a start flag 226, which is supplied to the sequencer 208. Whenever the start flag 226 is asserted, the sequencer 208 automatically reads the pointer supplied from the start structure queue 220 and begins processing the indicated bus operation information structure 212–216. After the sequencer 208 reads the supplied pointer, the start structure queue 220 supplies the next entry 224 that contains a pointer to an unprocessed bus operation information structure 212–216. As long as the start structure queue 220 has an entry 224 containing a pointer to an unprocessed bus operation information structure 212–216, the start structure queue 220 asserts the start flag 226. Thus, the sequencer 208 can always start processing the next unprocessed bus operation information structure 212–216 upon completing processing the previous bus operation information structure 212–216 without waiting for the processor 206 to instruct the sequencer 208 to do so. When the start structure queue 220 is empty, meaning that there are no bus operation information structures 212–216 that are ready for processing, the start flag 226 is deasserted. Upon completing processing the current bus operation information structure 212–216, when the sequencer 208 encounters the deasserted start flag 226, the sequencer 208 waits for the start flag 226 to be reasserted.

The structure complete queue 222 includes a queue of entries 228 that contain an identifier for, or pointer to, the bus operation information structures 212216 that have been processed by the sequencer 208 and are ready for new bus operation information. Thus, upon completing processing the current bus operation information structure 212–216, the sequencer 208 sends the pointer for the processed bus operation information structure 212–216 to the structure complete queue 222. The pointer is then placed in the next available entry 228. The pointer for the next bus operation information structure 212–216 that is available for receiving new bus operation information is supplied as an output value from the structure complete queue 222.

Whenever any of the entries 228 contains a pointer to an available bus operation information structure 212–216, the structure complete queue 222 asserts a complete flag 230, which is supplied to the processor 206. The processor 206 keeps a record of, or manages, the available bus operation information structures 212–216 in software. Therefore, whenever the complete flag 230 is asserted, the processor 206 reads the pointer supplied from the structure complete queue 222 and updates its record, or management information, accordingly. When the processor 206 receives an I/O message from the CPU 128, and if the processors information indicates that one of the bus operation information structures 212–216 is available, then the processor 206 begins forming the next bus operation information in the indicated bus operation information structure 212–216. After the processor 206 reads the supplied pointer, the structure complete queue 222 supplies the next entry 228 that contains a pointer to an available bus operation information structure 212–216. As long as the structure complete queue 220 has an entry 228 containing a pointer to a bus operation information structure 212–216 that has been processed by the sequencer 208, the structure complete queue 222 asserts the complete flag 230. Thus, the processor 206 can always start forming the next bus operation information in the next available bus operation information structure 212–216 upon completing forming the previous bus operation information in the previous bus operation information structure 212–216 without waiting for the sequencer 208 to inform the processor 206 that the bus operation information structure 212–216 has become available. When the structure complete queue 222 is empty, meaning that there are no pointers to processed bus operation information structures 212–216, the complete flag 230 is deasserted, so the processor 206 will not try to read the output from the structure complete queue 222.

In the above described manner, the processor 206 and the sequencer 208 both have only one signal (i.e. the start and complete flags 226 and 230) to use to determine whether they can proceed with forming or processing the next bus operation information structure 212–216. Therefore, this alternative embodiment is faster than the embodiment shown in FIG. 3.

When one of the SCSI units 122 sends information to the CPU 128, the sequencer 208 detects that the SCSI unit 122 is ready to send the information and performs an information input operation. Upon performing the information input operation, the sequencer 208 places information regarding the input information for use by the processor 206 for sending the input information to the CPU 128 in a separate "incoming" bus operation information structure 218. To inform the processor 206 that the updated bus operation information structure 212 or the incoming bus operation information structure 218 is ready for the processor 206 to send the input information to the CPU 128, the sequencer 208 sends a signal 156 to the processor 206 indicating that incoming bus operation information is available and indicating the bus operation information structure 212 or 218 that contains the changed bus operation information.

Figure 8:
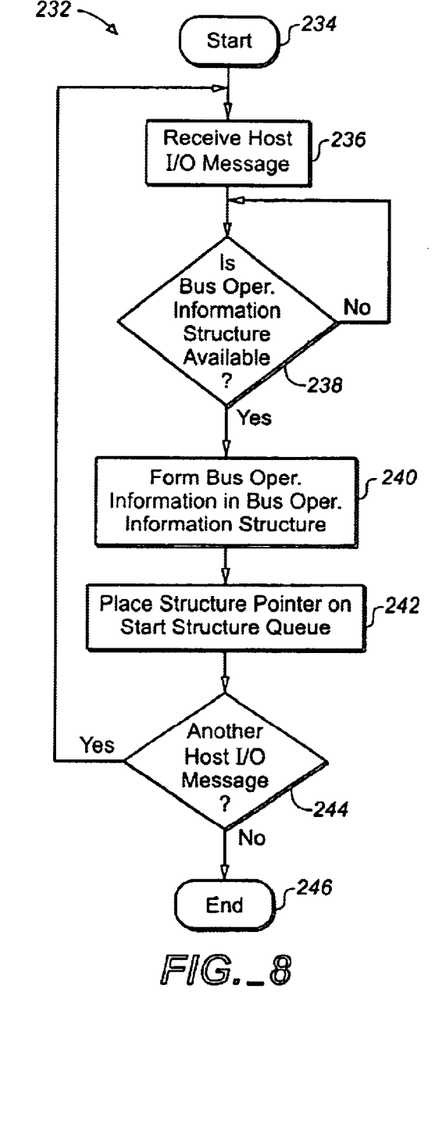
FIG. 8 is a flow chart of a procedure for performing a portion of the flow of information shown in FIG. 4 by a processor incorporated in the alternative SCSI host adapter shown in FIG. 7.

A procedure 232 for the processor 206 (FIG. 7) to form the bus operation information 160 (FIG. 4) and to instruct the sequencer 208 (FIG. 7) to start processing the bus operation information 160 is shown in FIG. 8. The procedure 232 starts at step 234. The processor 206 receives the host I/O message 158 (FIG. 4) at step 236. Then it is determined (step 238) whether one of the bus operation information structures 212–216 (FIG. 7) is available. If not, then the procedure 232 waits until one of the bus operation information structures 212–216 becomes available. When a bus operation information structure 212–216 is available, the bus operation information (describing the I/O sequence for carrying out the SCSI access request contained in the host I/O message 158) is formed (step 240) in the available bus operation information structure 212–216. The pointer for the bus operation information structure 212–216 is placed (step 242) on the start structure queue 220 (FIG. 7), a step similar to writing a conventional register. If there is another host I/O message 158 to be handled (step 244), then the procedure 232 repeats. If there is not another host I/O message 158 to be handled (step 244), then the procedure 232 ends at step 246, and the processor 206 waits for the next host I/O message 158 from the CPU 128.

Figure 9:
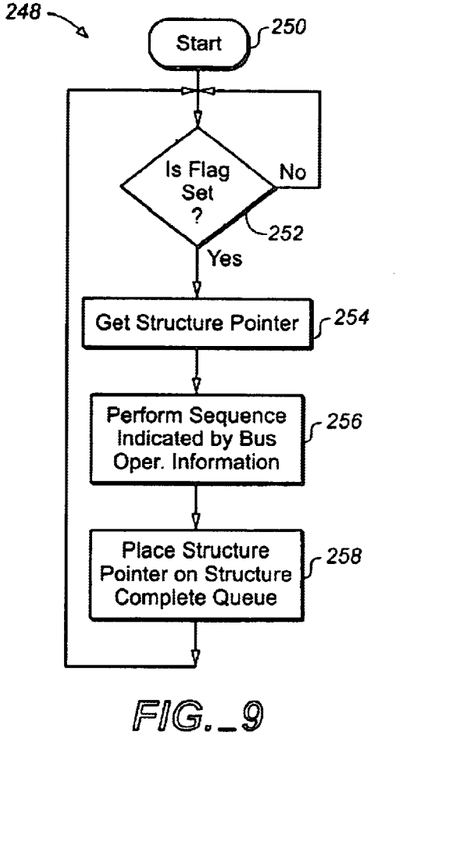
FIG. 9 is a flow chart of a procedure for performing another portion of the flow of information shown in FIG. 4 by a sequencer incorporated in the alternative SCSI host adapter shown in FIG. 7.

A procedure 248 for the sequencer 208 (FIG. 7) to process one of the bus operation information structures 212–216 (FIG. 7) is shown in FIG. 9. The procedure 248 starts at step 250. The sequencer 208 repeatedly checks (step 252) the start flag 226 until the start flag 226 has been set. The structure pointer identifying the bus operation information structure 212–216 to be processed is obtained from the start structure queue 220 (FIG. 7) at step 254. The sequence, or operation, indicated by the bus operation information 160 (FIG. 4) in the bus operation information structure 212–216 is performed (step 256). The pointer for the processed bus operation information structure 212–216 is placed (step 258) on the structure complete queue 222 (FIG. 7). The procedure 248 returns to step 252 to wait for the next assertion of the start flag 226 before proceeding further. The procedure 248 does not end until the SCSI host adapter 120 (FIGS. 2 and 3) is turned off.

The present invention has the advantage of being able to process consecutive bus operations (defined by the bus operation information) without having to wait for a significant amount of time between the consecutive bus operations. Information is included in the bus operation information, e.g. the owner and link fields, with which the sequencer can automatically determine whether it can process the bus operation information without waiting for a start signal from the processor. Likewise, the owner field enables the processor to automatically determine whether it can form the next bus operation information without waiting for a signal from the sequencer indicating that the next bus operation information structure is available. Alternatively, the queues 220 and 222 (FIG. 7) are used to reduce the time between processing each bus operation information structure and between forming each bus operation information structure.

The presently preferred embodiment of the present invention has been shown and described with a degree of particularity. These descriptions are of preferred examples of the invention. In distinction to its preferred examples, it should be understood that the scope of the present invention is defined by the scope of the following claims, which should not necessarily be limited to the detailed description of the preferred embodiment set forth above.

The invention claimed is:

1. A method of handling bus operations in a computer system having a processor for forming a plurality of bus operation information structures, a plurality of memory spaces for containing the bus operation information structures and a sequencer for processing the bus operation information structures to perform the bus operations, comprising the steps of:

sequentially forming each bus operation information structure by the processor in the memory spaces, said each bus operation information structure including both a command and data, said each bus operation information structure including an owner field indicating whether the processor or the sequencer has control over said each bus operation information structure;

upon forming each bus operation information structure, setting control over the bus operation information structure to the sequencer by setting a corresponding owner field of the bus operation information structure;

determining whether the sequencer has control over a first one of the bus operation information structures based on an owner field of the first one of the bus operation information structure;

upon determining that the sequencer has control over the first bus operation information structure, processing the first bus operation information structure by the sequencer;

determining whether the sequencer has control over a second one of the bus operation information structures based on an owner field of the second one of the bus operation information structure; and upon determining that the sequencer has control over the second bus operation information structure, processing the second bus operation information structure by the sequencer, wherein the computer system includes a central processing unit (CPU) and a bus adapter, the bus adapter including the processor, the sequencer and the memory spaces, the CPU being communicatively coupled to the bus adapter.

2. A method as defined in claim 1, wherein the computer system further has a queue of pointers and each pointer is set to identify one of the bus operation information structures when the identified bus operation information structure is ready for processing comprising the further steps of:

upon forming the first bus operation information structure, placing a pointer identifying the first bus operation information structure in the queue of pointers by the processor; and reading the pointer identifying the first bus operation information structure from the queue of pointers by the sequencer before processing the first bus operation information structure.

3. A method as defined in claim 2, wherein the queue of pointers supplies a start flag to the sequencer whenever the queue of pointers contains a pointer that has not been read by the sequencer, comprising the further steps of:

asserting the start flag after placing the pointer identifying the first bus operation information structure in the queue of pointers;

determining that the sequencer has control over the first bus operation information structure by receiving the start flag by the sequencer and reading the pointer identifying the first bus operation information structure from the queue of pointers.

4. A method as defined in claim 2, wherein the queue of pointers is a first queue of pointers and the computer system further has a second queue of pointers of which each pointer is set to identify one of the bus operation information structures when the identified bus operation information structure has been processed, comprising the further steps of:

after processing the first bus operation information structure, placing a pointer identifying the first bus operation information structure in the second queue of pointers by the sequencer;

reading the pointer identifying the first bus operation information structure from the second queue of pointers by the processor; and forming a third bus operation information structure in the same memory space containing the first bus operation structure.

5. A method as defined in claim 1, wherein the computer system further has a queue of pointers and each pointer is set to identify one of the bus operation information structures when the identified bus operation information structure has been processed, comprising the further steps of:

after processing the first bus operation information structure, placing a pointer identifying the first bus operation information structure in the queue of pointers by the sequencer;

reading the pointer identifying the first bus operation information structure from the queue of pointers by the processor; and forming a third bus operation information structure in the same memory space containing the first bus operation structure.

6. A method as defined in claim 5, wherein the queue of pointers supplies a complete flag to the processor whenever the queue of pointers contains a pointer that has not been read by the processor comprising the further steps of:

asserting the complete flag after placing the pointer identifying the first bus operation information structure in the queue of pointers;

determining that the processor has control over the first bus operation information structure by receiving the complete flag by the processor and reading the pointer identifying the first bus operation information structure from the queue of pointers.

7. A method as defined in claim 1 comprising the further step of:

upon forming the first bus operation information structure, sending a signal from the processor to the sequencer to start processing the first bus operation information structure.

8. A method as defined in claim 7 comprising the further steps of:

upon forming each bus operation information structure by the processor, associating the bus operation information structure with a link to a next bus operation information structure; and after processing each bus operation information structure by the sequencer, determining which bus operation information structure is to be processed next by reading the associated link to the next bus operation information structure.

9. A method as defined in claim 8, wherein each bus operation information structure includes a link field which indicates the next bus operation information structure, comprising the ether step of:

upon forming each bus operation information structure by the processor, setting the link field of the bus operation information structure to the next bus operation information structure to associate the bus operation information structure with the link.

10. A method as defined in claim 7 comprising the further steps of:

before forming each bus operation information structure, setting control over the bus operation information structure to the processor;

after processing the first bus operation information structure, determining whether the sequencer or the processor has control over the second bus operation information structure; and upon determining that the processor has control over the second bus operation information structure, waiting for the processor to send a signal to the sequencer to start processing the second bus operation information structure.

11. A method as defined in claim 7, comprising the further steps of:

sending a plurality of input/output (I/O) messages from the CPU to the bus adapter;

receiving the I/O messages at the processor in the bus adapter; and forming the bus operation information structures from the I/O messages.

12. A computer system comprising:

a bus across which information is transferred;

a plurality of memory spaces containing bus operation information structures describing bus operations to be performed on the bus, each of said bus operation information structures including both a command and data;

a sequencer connected to the memory spaces and to the bus to perform the bus operations on the bus upon processing the bus operation information structures, the sequencer performing the bus operation described by said each of said bus operation information structures if the sequencer has control over the bus operation information structure; and a processor connected to the memory spaces and to the sequencer to sequentially form the bus operation information structures in the memory spaces;

wherein said each of said bus operation information structures includes an owner field indicating whether the processor or the sequencer has control over said each of said bus operation information structure;

wherein the sequencer processes a first one of the bus operation information structures upon determining that the sequencer has control over the first one of the bus operation information structures based on an owner field of the first one of the bus operation information structure and the sequencer processes a second one of the bus operation information structures upon completion of processing the first bus operation information structure if it is determined that the sequencer has control over the second one of the bus operation information structures based on an owner field of the second one of the bus operation information structure; and wherein the computer system includes a central processing unit (CPU) and a bus adapter, the bus adapter including the processor, the sequencer and the memory spaces, the CPU being communicatively coupled to the bus adapter.

13. A computer system as defined in claim 12 wherein:

the computer system includes a queue of pointers, each pointer being set to identify one of the bus operation information structures when the identified bus operation information structure is ready for processing;

after forming the bus operation information structures, the processor sends the pointers to the queue of pointers identifying the formed bus operation information structures in the order that the bus operation information structures were formed;

the sequencer reads the pointers from the queue of pointers in the order in which the pointers were sent to the queue of pointers and processes the bus operation information structures in the same order; and upon completing processing the first bus operation information structure, the sequencer proceeds to process the second bus operation information structure if the queue of pointers contains a pointer for the second bus operation information structure.

14. A computer system as defined in claim 13 wherein:

the queue of pointers supplies a start flag to the sequencer whenever the queue of pointers contains a pointer that has not been read by the sequencer;

the sequencer proceeds to process a next one of the bus operation information structures upon completing processing a previous one of the bus operation information structures if the start flag is supplied to the sequencer and upon receiving the start flag if none of the bus operation information structures is currently being processed.

15. A computer system as defined in claim 12 wherein:

the computer system includes a queue of pointers, each pointer being set to identify one of the bus operation information structures when the identified bus operation information structure has been processed by the sequencer and the memory space containing the processed bus operation information structure is available for a new bus operation information structure to be formed therein;

after processing the bus operation information structures, the sequencer sends the pointers to the queue of pointers identifying the available memory spaces in the order that the bus operation information structures contained therein were processed;

the processor reads the pointers from the queue of pointers in the order in which the pointers were sent to the queue of pointers and forms the next bus operation information structure in one of the available memory spaces; and upon completing forming the first bus operation information structure, the processor proceeds to form the second bus operation information structure if there is at least the one available memory space.

16. A computer system as defined in claim 15 wherein:

the queue of pointers supplies a complete flag to the processor whenever the queue of pointers contains a pointer that has not been read by the processor;

the processor proceeds to form a next one of the bus operation information structures upon completing forming a previous one of the bus operation information structures if there is the at least one available memory space and upon receiving the complete flag if none of the memory spaces is currently available.

17. A computer system as defined in claim 12, wherein the processor is operative to form the bus operation information structures from received input/output (I/O) messages; and the CPU is connected to the bus adapter at the processor and operative according to software programming to prepare the I/O messages and to send the I/O messages to the bus adapter, the I/O messages defining I/O operations to be performed through the bus.

18. A computer system as defined in claim 12 wherein:

the processor sets the owner field of each bus operation information structure to indicate that the sequencer has control over the bus operation information structure upon forming the bus operation information structure and before sending a start signal to the sequencer; and the sequencer sets the owner field of each bus operation information structure to indicate that the processor has control over the bus operation information structure after processing the bus operation information structure.

19. A computer system as defined in claim 12 wherein:

the sequencer does not process the second bus operation information structure if the owner field of the second bus operation information structure indicates that the sequencer does not have control over the second bus operation information structure and the sequencer waits to receive a start signal from the processor before processing the second bus operation information structure.

20. A computer system as defined in claim 12 wherein:

each bus operation information structure includes link information indicating a next one of the bus operation information structures to be processed by the sequencer after processing a current one of the bus operation information structures; and the sequencer determines which one of the bus operation information structures is the next bus operation information structure from the link information of the current bus operation information structure and determines whether to begin processing the next bus operation information structure from the owner field of the next bus operation information structure.

21. A computer system as defined in claim 20 wherein:

each bus operation information structure includes a link field containing the link information; and the link field of each bus operation information structure is set by the processor to indicate the next bus operation information structure upon forming the current bus operation information structure.

* * * * *